United States Patent [19]
Wang

[11] Patent Number: 5,927,172
[45] Date of Patent: Jul. 27, 1999

[54] VENETIAN BLIND CUTTING MACHINE

[76] Inventor: Cherng-Fa Wang, 5F-23, No. 70, Fu Hsing Road, Tao Yuan City, Taiwan

[21] Appl. No.: 09/009,937

[22] Filed: Jan. 21, 1998

[51] Int. Cl.⁶ .................................................. B23D 23/00
[52] U.S. Cl. ........................... 83/454; 83/468.7; 83/639.1
[58] Field of Search ................................. 83/13, 39, 451, 83/452, 467.1, 639.1, 613, 685, 694, 953, 468.7, 454; 29/24.5

[56] References Cited

U.S. PATENT DOCUMENTS

| | | | |
|---|---|---|---|
| 2,789,639 | 4/1957 | Lorentzen | 83/13 |
| 4,819,530 | 4/1989 | Huang | 83/39 |
| 5,103,702 | 4/1992 | Yannazzone | 83/39 |
| 5,339,716 | 8/1994 | Sands et al. | 83/452 |
| 5,799,557 | 9/1998 | Wang | 83/452 |

*Primary Examiner*—Rinaldi I. Rada
*Assistant Examiner*—Gyounghyun Bae
*Attorney, Agent, or Firm*—Dougherty & Troxell

[57] ABSTRACT

Disclosed is a venetian blind cutting machine including a worktable on which a cylinder, multiple dies, a limiting mechanism, and a cutting tool connected to an output end of the cylinder are arranged. A die holder is fixed onto the worktable to hold selected dies. The dies are formed of sliding channels into which the cutting tool extends to slidably move. The cutting tool is formed of multiple blades in the same number as that of dies on the die holder. The limiting mechanism is adjustably located at one side of the dies to hold components of a venetian blind in place, so that the venetian blind can be accurately cut to desired dimensions by the blades of the cutting tool.

9 Claims, 4 Drawing Sheets

VENETIAN BLIND CUTTING MACHINE

BACKGROUND OF THE INVENTION

The present invention relates to a venetian blind cutting machine, and more particularly to a venetian blind cutting machine in which multiple replaceable dies and a cutting tool with multiple blades are used to complete cutting of the venetian blind while one single cylinder with reduced stroke is sufficient to control the cutting tool.

A venetian blind mainly includes an upper rail frame, a plurality of strips, and a lower frame. The upper rail frame, the strips, and the lower frame are sequentially connected to one another by cotton strings extending through them. Since the strips are made of thin and soft material, the whole venetian blind must be processed and cut with great care, lest it should be damaged before it becomes a finished product.

In the process of forming a venetian blind, it must be cut to a width which is the same as an actual width of the window for which the venetian blind is used. It is very troublesome to cut the upper rail frame and the lower frame. Both the upper rail frame and the lower frame are designed to have cross sections of fixed specifications. However, they are so different in their cross sectional shapes that they must be fabricated and cut with separate and different cutting apparatus. Furthermore, two groups of different dies and cutting tools must be separately designed for these two components with different sectional shapes, and the cutting apparatus are bulky in volume, resulting in a waste of resources.

Moreover, to cut a set of venetian blind, it is necessary to manually send the venetian blind to a rail frame cutting apparatus and then to a lower frame cutting apparatus. Such steps are repeated and doubtlessly consume a lot of labors. The thin and soft strips tend to be damaged during cutting and other fabricating processes. To improve the old method of fabricating venetian blinds, there was developed a venetian blind cutting machine which mainly includes a worktable supporting a die, and a cylinder for controlling a cutting tool corresponding to the die. Since a full set of venetian blind includes at least an upper rail frame, a plurality of strips, and a lower frame, the die mounted on the worktable must be provided with at least three fixing holes separately corresponding to the shapes of the upper rail frame, the strips, and the lower frame, so that the upper rail frame, the strips, and the lower frame may be separately extended through the fixing holes and be cut by the cylinder-controlled cutting tools.

Since there are various of different sectional shapes for the upper rail frame, the strip, and the lower frame, and since the numbers of the strips also have influence on the dimensions of the venetian blind, a plurality of dies must be cut to each contains a group of three fixing holes, so that one of these dies will fit for the upper rail frame, the strips, and the lower frame of a venetian blind to be cut. More specifically, when the upper rail frame, for example, is changed with the strips and the lower frame keeping unchanged, a completely different die must still be cut or prepared. This is the same in the event only the lower frame or the number or shape of the strips is changed.

In the above-described conventional venetian blind cutting machine, one single tool with only one blade is used to cut the upper rail frame, the strips, and the lower frame at a time. Thus, the blade of the cutting tool is usually badly worn after each cut. Meanwhile, a cylinder with a long stroke is required to control the tool that, of course, results in increased cost. And, when a big number of strips are included in the venetian blind to be cut, it is possible that a secondary cylinder controlling another cutting tool must be mounted below the worktable to help cut the venetian blind if the initial cylinder's stroke is not long enough to successfully complete the cut alone. These all result in increased costs for cylinders and cutting tools. In view of the drawbacks that result in high manufacturing cost of the conventional venetian blind cutting machine, it is therefore desirable to develop an improved venetian blind cutting machine to eliminate these drawbacks.

SUMMARY OF THE INVENTION

A primary object of the present invention is to provide a venetian blind cutting machine which includes a worktable on which a cylinder, at least one die, a limiting mechanism, and a cutting tool connected to an output end of the cylinder are arranged. A die holder is provided on the worktable. Multiple dies are arranged side by side in and connected to the die holder with screws. Each die is formed of sliding channels to receive the cutting tool therein. The cutting tool is provided with blades in the same number as that of dies on the die holder. The limiting mechanism is located at another side of the dies to fix the venetian blind to be cut in place after the upper rail frame, the strips, and the lower frame of the venetian blind have been separately extended through the dies, so that the cutting can be more accurately proceeded. Different dies may be selected and positioned in the die holder as needed to separately match the sectional shape of the upper rail frame, the strips, and the lower frame of the venetian blind. Multiple blades on the cutting tool corresponding to the number of dies allows the cutting to be completed with one single tool-controlling cylinder and shortened stroke of the cylinder. On the other hand, the cutting tool may also have a prolonged usable life.

DETAILED DESCRIPTION OF THE PREFERRED EMBODIMENT

Figure 1:
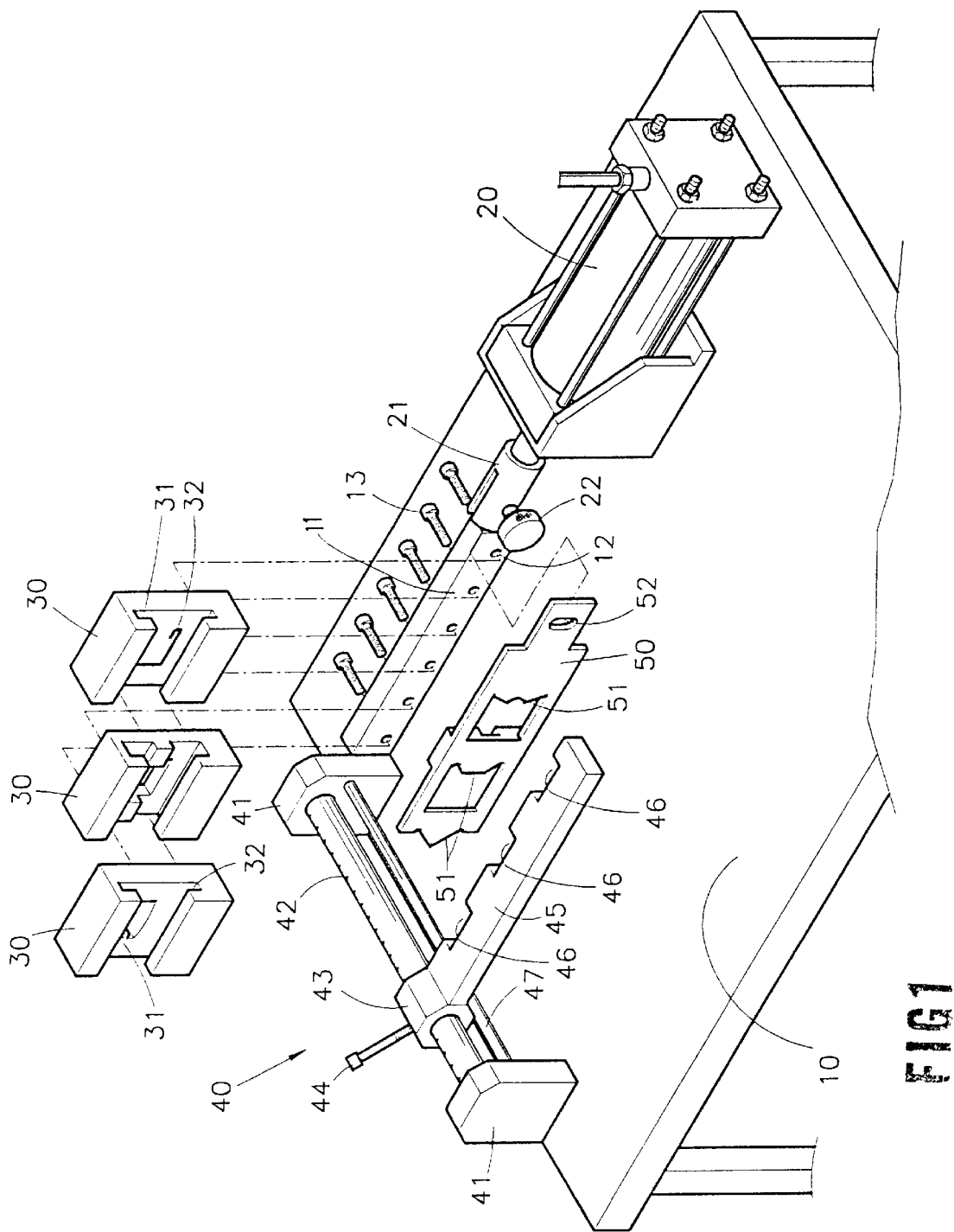
FIG. 1 is an exploded perspective of the present invention.
Figure 3:
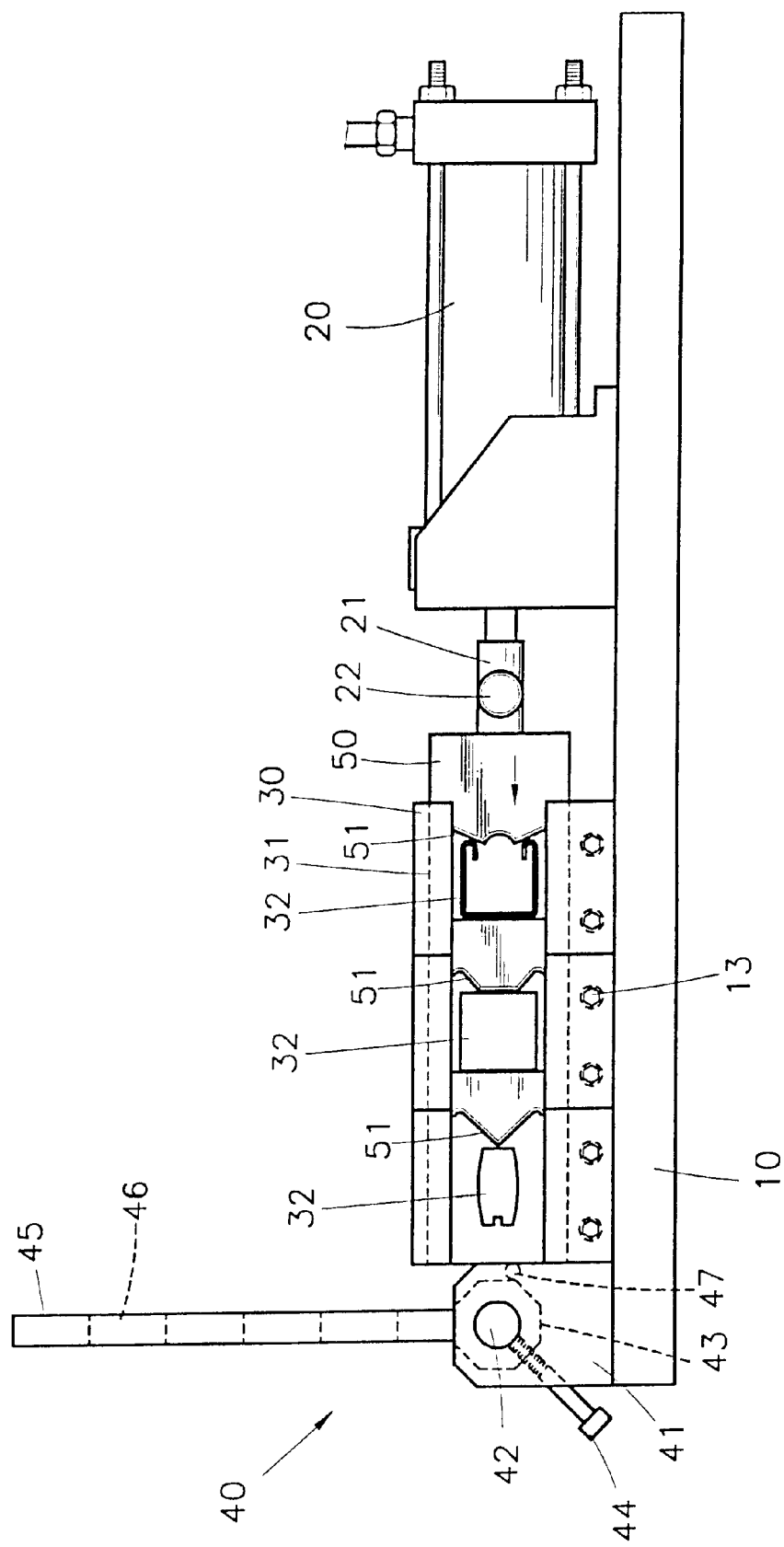
FIG. 3 is a side view of the present invention showing the operation thereof.

Please refer to FIGS. 1 and 3 at the same time. The present invention relates to a venetian blind cutting machine including a worktable 10 on which a cylinder 20, dies 30, a limiting mechanism 40, and a cutting tool 50 connected to an output end of the cylinder 20 are arranged.

A die holder 11 having multiple pairs of through holes 12 is provided on the worktable 10. The dies 30 are removably connected to the die holder 11 by means of screws 13 threaded through the pairs of through holes 12.

A tool holder 21 is connected to the output end of the cylinder 20 to receive the cutting tool 50 thereinto. A rotatable knob 22 is provided to one side of the tool holder 21. The cutting tool 50 maybe fixedly mounted onto the tool holder 21 by rotating and thereby tightening the rotatable knob 22 against the tool holder 21.

The dies 30 have similar contour and outer dimensions and all are formed of sliding channels 31 to receive the cutting tool 50 so that the latter may slidably move in the dies 30. Each of the dies 30 is provided on a main wall surfaces with a fixing hole 32 having a configuration corresponding to a sectional shape of either an upper rail frame, multiple strips, or a lower frame of different venetian blinds.

Figure 5:
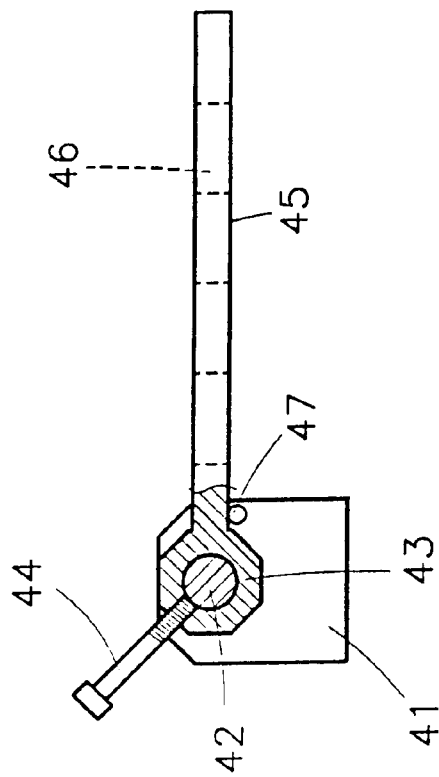
FIGS. 4 and 5 illustrate the operation of the limiting mechanism of the present invention.
Figure 4:
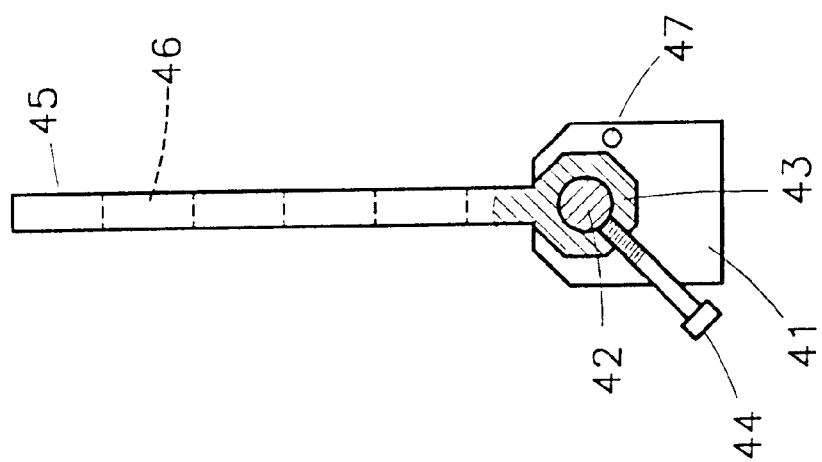

Please refer to FIGS. 1, 4 and 5 for the structure and operation of the limiting mechanism 40 of the present invention. The limiting mechanism 40 is located at one side of the die holder 11 and mainly includes two stationary members 41, a sliding rail 42 with scales extending between the two stationary members 41, a collar 43 put around the sliding rail 42, a threaded rod 44 for fixing the collar 43 to the sliding rail 42, and a stopper 45 extending from one side of the collar 43. When the threaded rod 44 is loosened, the collar 43 is allowed to slide along or turn about the sliding rail 42. The stopper 45 is provided at one side facing the die holder 11 with limiting recesses 46. The numbers of the limiting recesses 46 correspond to that of the dies 30 on the die holder 11. The limiting recesses 46 are located to respectively align with the fixing holes 32 of the dies 30 mounted on the die holder 11, so that they may cooperate with the fixing holes 32 to fix the upper rail frame, the strips, and the lower frame of the venetian blind in place after the upper rail frame, the strips, and the lower frame have been extended through the fixing holes 32 toward the stopper 45. There is also a locating bar 47 extending between the two stationary members 41. An end of the stopper 45 connected to the collar 43 abuts against the locating bar 47 to keep the stopper 45 in a horizontal position and the limiting recesses 46 aligned with the fixing holes 32.

The cutting tool 50 is slidingly movable in the sliding channels 31 of the dies 30 mounted on the die holder 11. The cutting tool 50 is formed of blades 51 in the same number as that of dies 30 on the die holder 11. A connecting hole 52 is provided near one end of the cutting tool 50 facing the tool holder 21 for the knob 22 to extend through, so that the cutting tool 50 is firmly connected to the tool holder 21.

Figure 2:
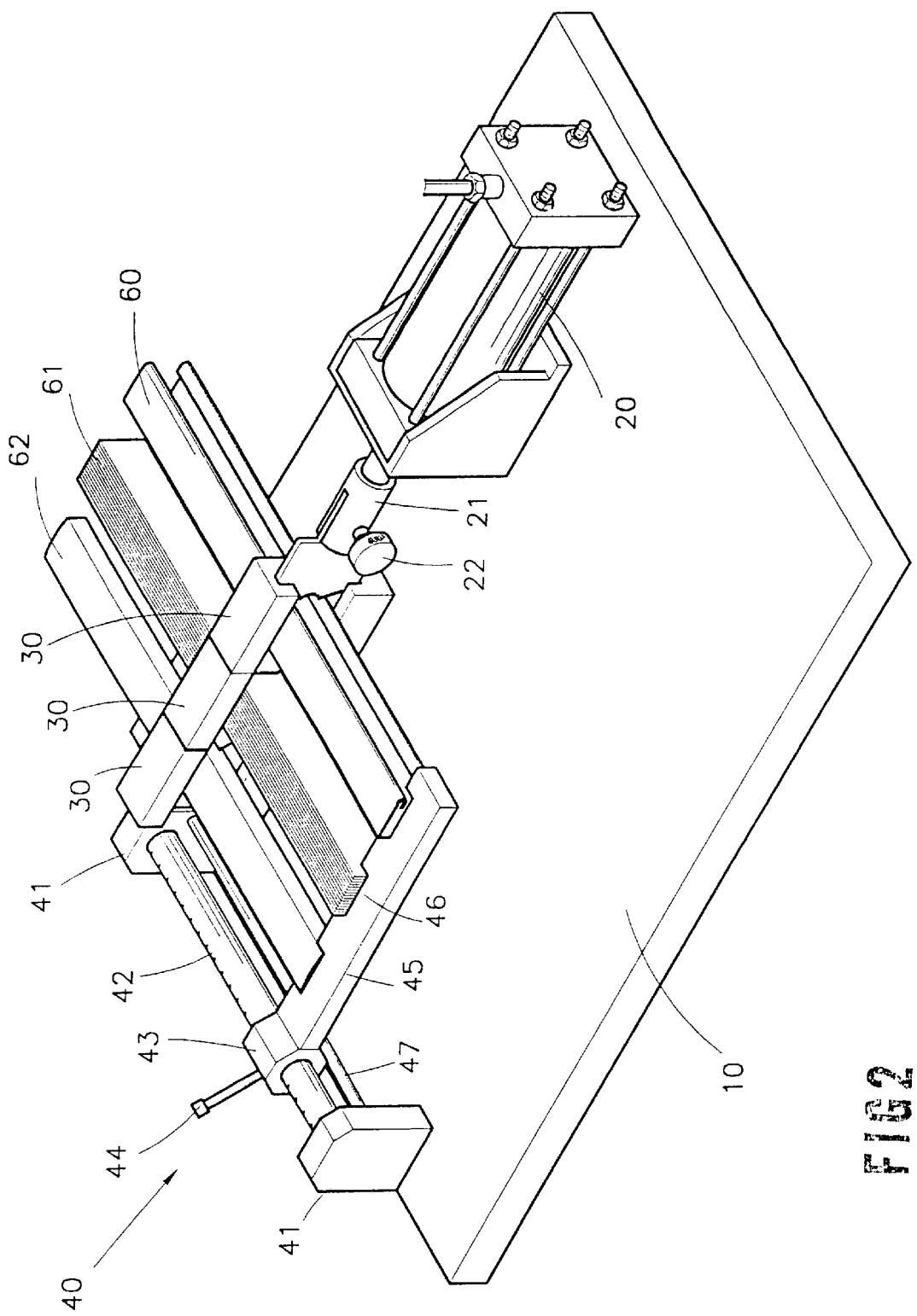
FIG. 2 is an assembled perspective of the present invention showing the manner in which an upper rail frame, a plurality of strips, and a lower frame of a venetian blind is cut with the present invention.

Please now refer back to FIG. 2. An upper rail frame 60, a plurality of strips 61, and a lower frame 62 of a venetian blind to be cut into desired dimensions are respectively extended through corresponding fixing holes 32 on dies 30 mounted on the die holder 11 to press their one end against the limiting recesses 46 of the stopper 45. The stopper 45 may be shifted along the sliding rail 42 to adjust its position relative to the dies 30, depending on dimensions of the venetian blind to be cut. After the upper rail frame 60, the strips 61, and the lower frame 62 of the venetian blind to be cut have been correctly positioned, the cylinder 20 is actuated to push the cutting tool 50 forward, so that the blades 51 of the cutting tool 50 respectively cut the upper rail frame 60, the strips 61, and the lower frame 62 at the same time.

In the above-described cutting manner, each stroke of the cylinder 20 equals to a distance to which the cutting tool 50 is moved forward. That is, each stroke of the cylinder 20 equals to a maximum depth of the upper rail frame 60 and the lower frame 62 or a maximum thickness of the strips 61 in the fixing holes 32. Whereby, only one single cylinder 20 is required to control the cutting tool 50 and a non-expensive short-stroke cylinder 20 will be sufficient for the present invention. In addition, a reduced time period is needed for the blades 51 of the cutting tool 50 to complete the cutting. Therefore, the blades 51 are not easily subject to wear and the cutting tool 50 may have a prolonged usable life.

Moreover, since separate dies 30 can be freely and conveniently selected and mounted on the die holder 11 to respectively match with different sectional shapes of the upper rail frame 60, the strips 61, and the lower frame 62, only one individual small die 30 with one fixing hole instead of a big die with three fixing holes needs to be replaced when any of the upper rail frame, the strip, or the lower frame in an earlier batch of venetian blinds having been cut has a sectional shape different from that in a next batch of venetian blinds to be cut. Labors for replacing bulky dies and costs for preparing different dies can therefore be reduced.

What is claimed is:

1. A venetian blind cutting machine, comprising:
   a cylinder mounted on a worktable;
   a plurality of individual dies having similar contour and outer dimensions such that said plurality of individual dies can be freely selected and combined to form a desired group as needed;
   a die holder mounted on said worktable for holding a group of desired dies selected from said plurality of individual dies;
   a limiting mechanism mounted on said worktable and located at one side of said die holder; and
   a cutting tool attached to an output end of said cylinder, wherein said limiting mechanism includes two stationary members, a sliding rail extending between said two stationary members, a collar extending around said sliding rail, and a threaded rod adjustably locking said collar to said sliding rail, said collar being movable with respect to said sliding rail when said threaded rod is loosened from said collar and said sliding rail, said limiting mechanism further including a stopper sidewardly extending from said collar, said stopper being provided at one side facing said die holder with limiting recesses corresponding to fixing holes on said plurality of individual dies mounted on said die holder, such that said limiting recesses and said fixing holes together hold an upper rail frame, a plurality of strips, and a lower frame of said venetian blind separately extended through said fixing holes in place.

2. The venetian blind cutting machine as claimed in claim 1, wherein said cutting tool is attached to an output end of said cylinder via a tool holder fixed to said output end of said cylinder.

3. The venetian blind cutting machine as claimed in claim 1, wherein said plurality of individual dies have sliding channels and are provided at a respective main wall with a fixing hole, said fixing hole on each die having a shape different from one die to another.

4. The venetian blind cutting machine as claimed in claim 1, wherein said die holder has multiple pairs of through holes through which screws may be threaded to connect said dies to said die holder.

5. The venetian blind cutting machine as claimed in claim 1, wherein said cutting tool is received and slidingly movable in said sliding channels of said plurality of individual dies.

6. The venetian blind cutting machine as claimed in claim 5, wherein said cutting tool has blades in the same number as that of said plurality of individual dies, and said cutting tool being provided near an end facing said cylinder with a connecting hole.

7. The venetian blind cutting machine as claimed in claim 6, wherein said tool holder has a rotatable knob at one side which extends through said connecting hole on said cutting tool received in said tool holder, such that said cutting tool is firmly connected to said tool holder.

8. The venetian blind cutting machine as claimed in claim 1, wherein sliding rail is provided with scales.

9. The venetian blind cutting machine as claimed in claim 1, wherein said limiting mechanism further includes a locating bar extending between said two stationary members, such that said stopper abuts against said locating bar to keep said stopper in a horizontal position and said limiting recesses on said stopper aligned with said fixing holes on said plurality of individual dies.

* * * * *